(12) United States Patent
Okano

(10) Patent No.: US 8,259,115 B2
(45) Date of Patent: Sep. 4, 2012

(54) GRAPH DISPLAY APPARATUS, GRAPH DISPLAY METHOD, AND STORAGE MEDIUM STORING PROGRAM

(75) Inventor: Mitsuru Okano, Akiruno (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 13/081,708

(22) Filed: Apr. 7, 2011

(65) Prior Publication Data

US 2011/0254862 A1  Oct. 20, 2011

(30) Foreign Application Priority Data

Apr. 16, 2010 (JP) .................................. 2010-095405

(51) Int. Cl.
*G06T 11/20* (2006.01)
*G06F 3/048* (2006.01)

(52) U.S. Cl. .................. 345/440; 345/440.1; 345/440.2; 345/441; 345/442; 708/160; 708/174

(58) Field of Classification Search .................. 345/440, 345/440.1, 440.2, 441, 442; 708/160–174
See application file for complete search history.

(56) References Cited

U.S. PATENT DOCUMENTS

| | | | | | |
|---|---|---|---|---|---|
| 4,794,553 | A | * | 12/1988 | Watanabe et al. .............. | 708/160 |
| 4,794,554 | A | * | 12/1988 | Tamiya .......................... | 708/160 |
| 5,210,708 | A | * | 5/1993 | Negishi .......................... | 708/174 |
| 5,303,338 | A | * | 4/1994 | Handa et al. ................... | 345/440 |
| 5,412,769 | A | * | 5/1995 | Maruoka et al. ............... | 345/440 |
| 5,485,564 | A | * | 1/1996 | Miura ............................ | 345/440 |
| 5,535,317 | A | * | 7/1996 | Tanaka et al. .................. | 345/440 |
| 5,539,867 | A | * | 7/1996 | Handa et al. ................... | 345/440 |
| 5,557,718 | A | * | 9/1996 | Tsuneyoshi et al. ........... | 345/440 |
| 5,870,319 | A | * | 2/1999 | Thornton et al. .............. | 708/160 |
| 6,133,924 | A | * | 10/2000 | Ito et al. ......................... | 345/440 |

(Continued)

FOREIGN PATENT DOCUMENTS

JP  9-185586 A  7/1997

(Continued)

OTHER PUBLICATIONS

Japanese Office Action dated Jul. 12, 2011 and English translation thereof in counterpart Japanese Application No. 2010-095405.

(Continued)

*Primary Examiner* — Jin-Cheng Wang
(74) *Attorney, Agent, or Firm* — Holtz, Holtz, Goodman & Chick, PC

(57) ABSTRACT

There is provided a graph display apparatus. An image display control unit causes a display unit to display the image data stored by the image and graph formula storage unit. An formula input unit inputs a graph formula according to a user operation. An input graph display control unit causes the display unit to display a graph corresponding to a graph formula input by the formula input unit, on the image data displayed on the display unit by the image display control unit as a background image. A model graph display control unit causes the display unit to display, in a different display mode, a graph corresponding to a model graph formula stored by the image and graph formula storage unit, together with the graph displayed on the image data as the background image on the display unit by the input graph display control unit, according to a user operation.

10 Claims, 11 Drawing Sheets

U.S. PATENT DOCUMENTS

| | | | |
|---|---|---|---|
| 7,289,120 B2* | 10/2007 | Fukaya | 345/440 |
| 2003/0006986 A1* | 1/2003 | Dick et al. | 345/440 |
| 2003/0182333 A1* | 9/2003 | Good et al. | 708/131 |
| 2004/0083247 A1* | 4/2004 | Koont | 708/160 |
| 2007/0188496 A1* | 8/2007 | Igusa | 345/440 |
| 2009/0058858 A1* | 3/2009 | Yoshikawa | 345/440 |
| 2009/0254597 A1* | 10/2009 | Karoji | 708/130 |

FOREIGN PATENT DOCUMENTS

| | | |
|---|---|---|
| JP | 10-161980 A | 6/1998 |
| JP | 10-161981 A | 6/1998 |
| JP | 2005-107862 A | 4/2005 |
| JP | 2005-107908 A | 4/2005 |
| JP | 2005-321646 A | 11/2005 |
| JP | 2008-171384 A | 7/2008 |

OTHER PUBLICATIONS

Katagiri, Shigenobu, et al. "New Mathematical and Computer Series 7 Cruves and Graphics Processing Based on Mathematical Software." Japan: Tokyo Denki University Press, Jun. 30, 1995: 1$^{st}$ edition, 1$^{st}$ printing, pp. 1-11.

* cited by examiner

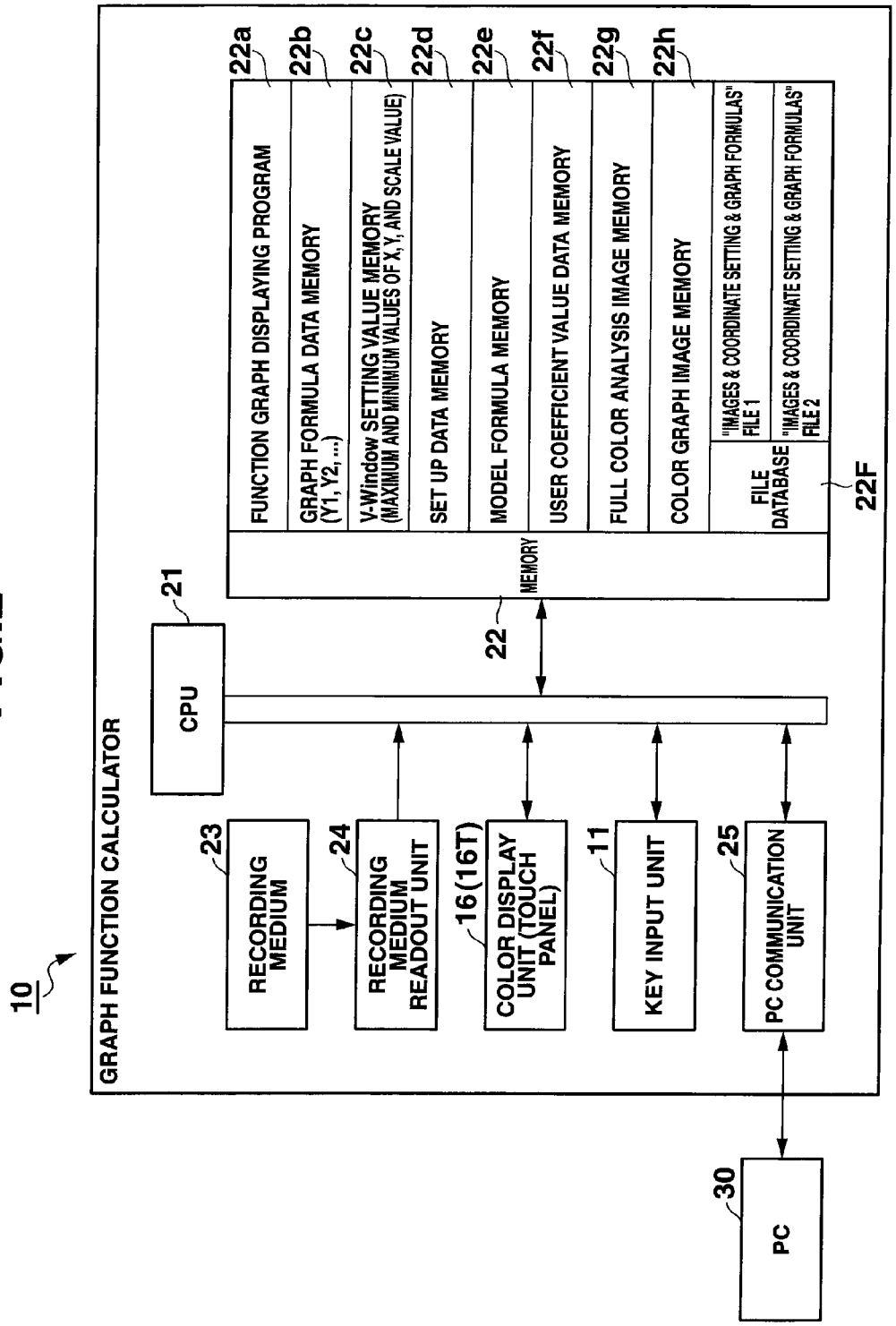

FIG.3

| 22F FILE DATABASE (IMAGES & COORDINATE SETTING & GRAPH FORMULAS FILE) | | COORDINATE SETTING DATA | | | | | GRAPH FORMULA DATA | |
|---|---|---|---|---|---|---|---|---|
| | | | RANGE SETTING | | | | | |
| No. | FILE NAME | IMAGE | X: MINIMUM/ MAXIMUM VALUES | Y: MINIMUM/ MAXIMUM VALUES | X: SCALE VALUE | Y: SCALE VALUE | DISPLAY SETTING | GRAPH FORMULA | COEFFICIENT VALUE (ALLOWABLE RANGE) |
| 1 | BASKET.g3m | 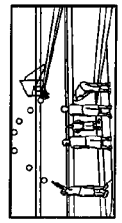 | -1.0277<br>9.4272 | -0.4722<br>4.6944 | 0.5 | 1 | Grid: Line<br>Axes: Scale<br>Label: On<br>VWLock: On | $Y2 = -0.4(X-2.5)^2 + 4.5$ | - |
| 2 | BALL.g3m | 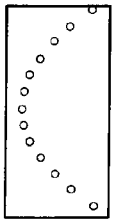 | -0.15<br>6.15 | 0<br>3 | 0.5 | 0.5 | Grid: Line<br>Axes: On<br>Label: Off<br>VWLock: On | $Y2 = PX^2 + QX + R$ | $P = -0.26 (\pm 0.06)$<br>$Q = 1.6 (\pm 0.2)$<br>$R = 0.3 (\pm 0.2)$ |

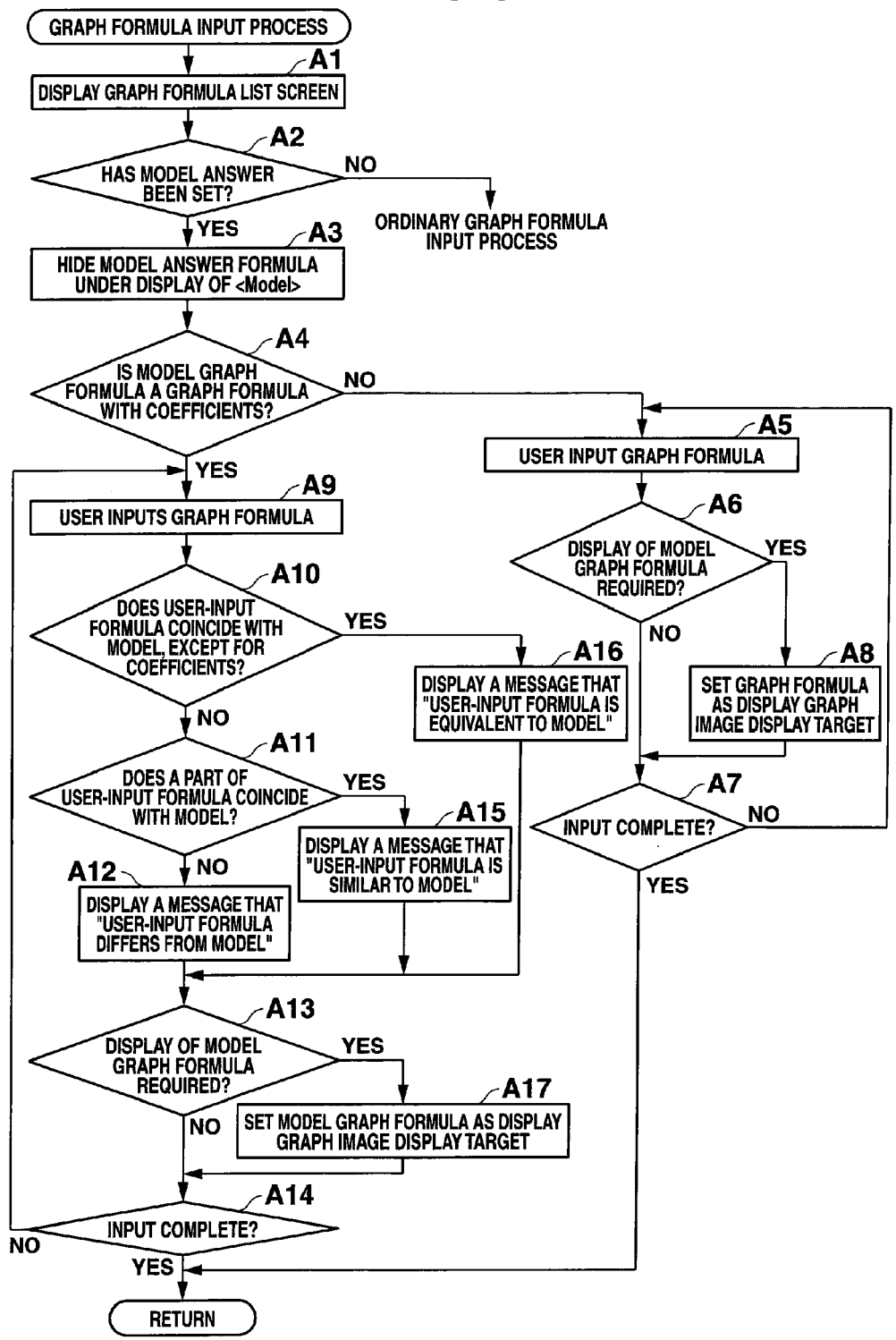

[Set up]

[F2]

[EXE]

[MENU]
(Picture Graph) SELECT
[FILE]
[OPEN]

[OPEN]
"SELECT BALL"

[G↔T]
"INPUT GRAPH FORMULA"
[EXE]

"INPUT GRAPH FORMULA"
[EXE]

"INPUT GRAPH FORMULA"
[EXE]

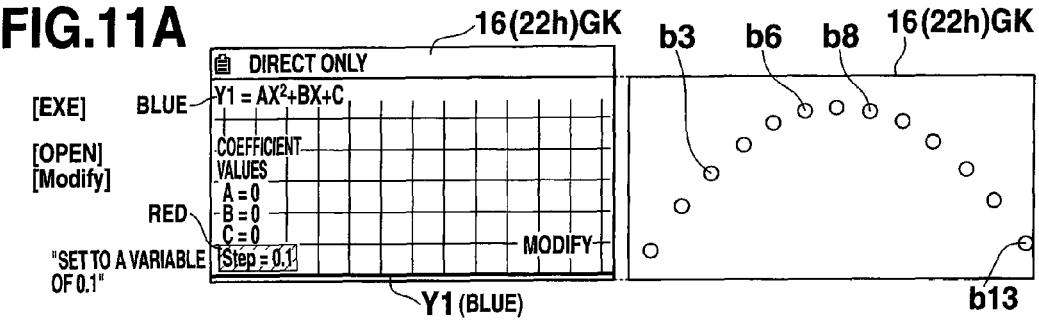
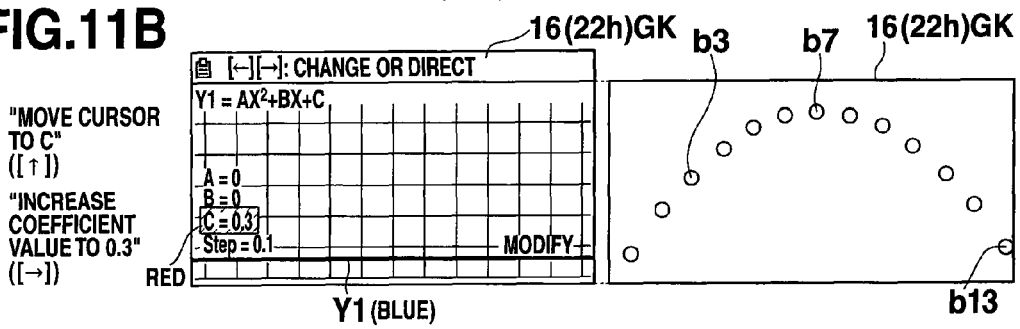
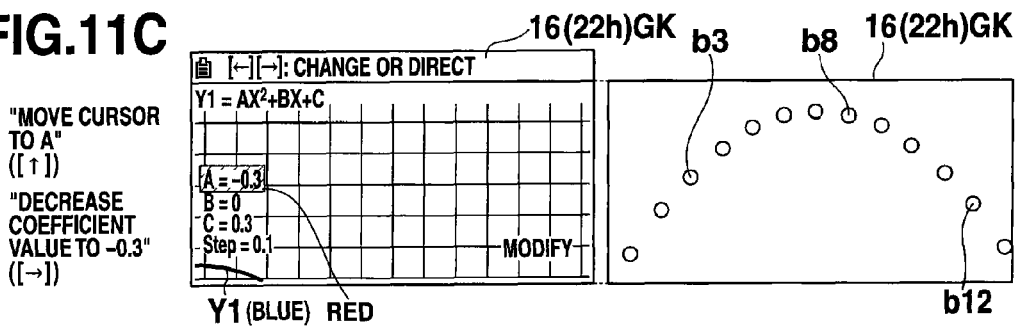
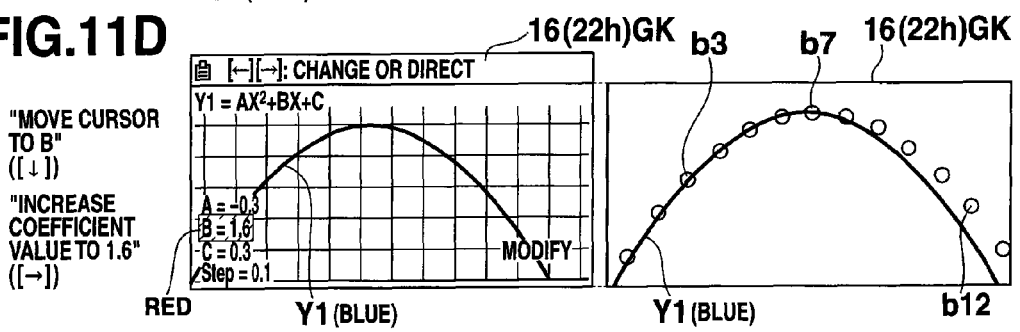
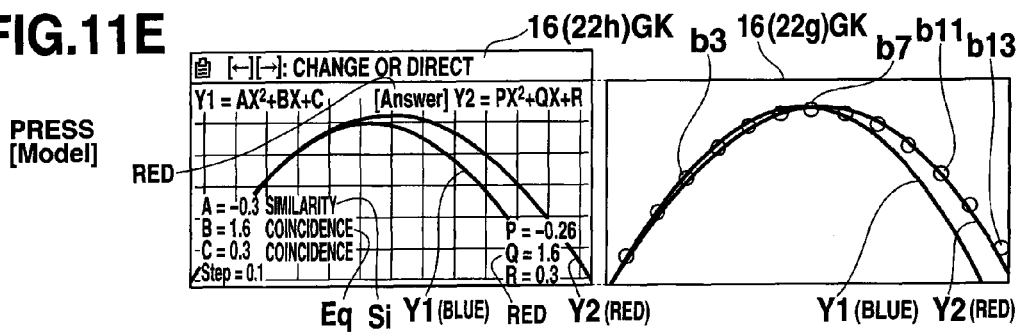

GRAPH DISPLAY APPARATUS, GRAPH DISPLAY METHOD, AND STORAGE MEDIUM STORING PROGRAM

CROSS-REFERENCE TO RELATED APPLICATIONS

This application is based upon and claims the benefit of priority from prior Japanese Patent Application No. 2010-095405, filed Apr. 16, 2010, the entire contents of which are incorporated herein by reference.

BACKGROUND OF THE INVENTION

1. Field of the Invention

The present invention relates to a graph display apparatus, a graph display method, and a storage medium storing a program, capable of displaying, for example, the trajectory of a moving body included in a captured image in graph form for a learning purpose.

2. Description of the Related Art

To support a person's learning, an electronic computer system, such as a client-server system, has been used.

For example, a learning server creates question information according to the learning progress of each learner and displays the information on a learning terminal. Then, the learning server makes a true-false judgment on the basis of answer information sent from the learning terminal and displays the question information repeatedly until the answer is passed. By doing this, a conventional learning-support system enables a learner not only to learn according to the learner's learning progress but also to continue motivation for learning.

For example, the trajectory of a ball or a fountain included in a composite image consecutively captured was analyzed in graph form. To learn its graph formula, only an evaluation of a correct or an incorrect answer was output, depending on whether the graph formula input as an answer by the learner coincided with a correct graph formula previously stored.

Therefore, the following problem arose: the learner could not try to input a graph formula as an answer repeatedly, while checking how much a graph corresponding to a learner-input graph formula differed from a dynamic trajectory to be analyzed on the image or a correct graph, which prevented effective learning.

BRIEF SUMMARY OF THE INVENTION

Accordingly, it is an object of the invention to provide a graph display apparatus, a graph display method, and a storage medium storing a program, which enable a user to check the difference between a graph corresponding to a graph formula input by the user and its correct answer on an image when analyzing a dynamic trajectory on the image and learn the graphs effectively and a control program for the graph display apparatus.

According to one aspect of the invention, there is provided a graph display apparatus comprising: an image and graph formula storage unit configured to store image data and a model graph formula corresponding to the image data; an image display control unit configured to cause a display unit to display the image data stored by the image and graph formula storage unit; an formula input unit configured to input a graph formula according to a user operation; an input graph display control unit configured to cause the display unit to display a graph corresponding to a graph formula input by the formula input unit, on the image data displayed on the display unit by the image display control unit as a background image; and a model graph display control unit configured to cause the display unit to display, in a different display mode, a graph corresponding to a model graph formula stored by the image and graph formula storage unit, together with the graph displayed on the image data as the background image on the display unit by the input graph display control unit, according to a user operation.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 2 is a block diagram showing a configuration of the electronic circuitry of the graph function calculator 10;

FIG. 3 is a table showing the contents of an "Images & Coordinate setting & Graph formulas" file stored in a file database 22F of the graph function calculator 10;

FIG. 6 is a flowchart to explain a graph formula input process accompanying the function graph display process (part 1) performed by the graph function calculator 10;

FIGS. 11A, 11B, 11C, 11D and 11E are diagrams showing display operations (part 2) of the second embodiment in the function graph display process of the graph function calculator 10.

DETAILED DESCRIPTION OF THE INVENTION

Hereinafter, referring to the accompanying drawings, embodiments of the invention will be explained.

Figure 1:
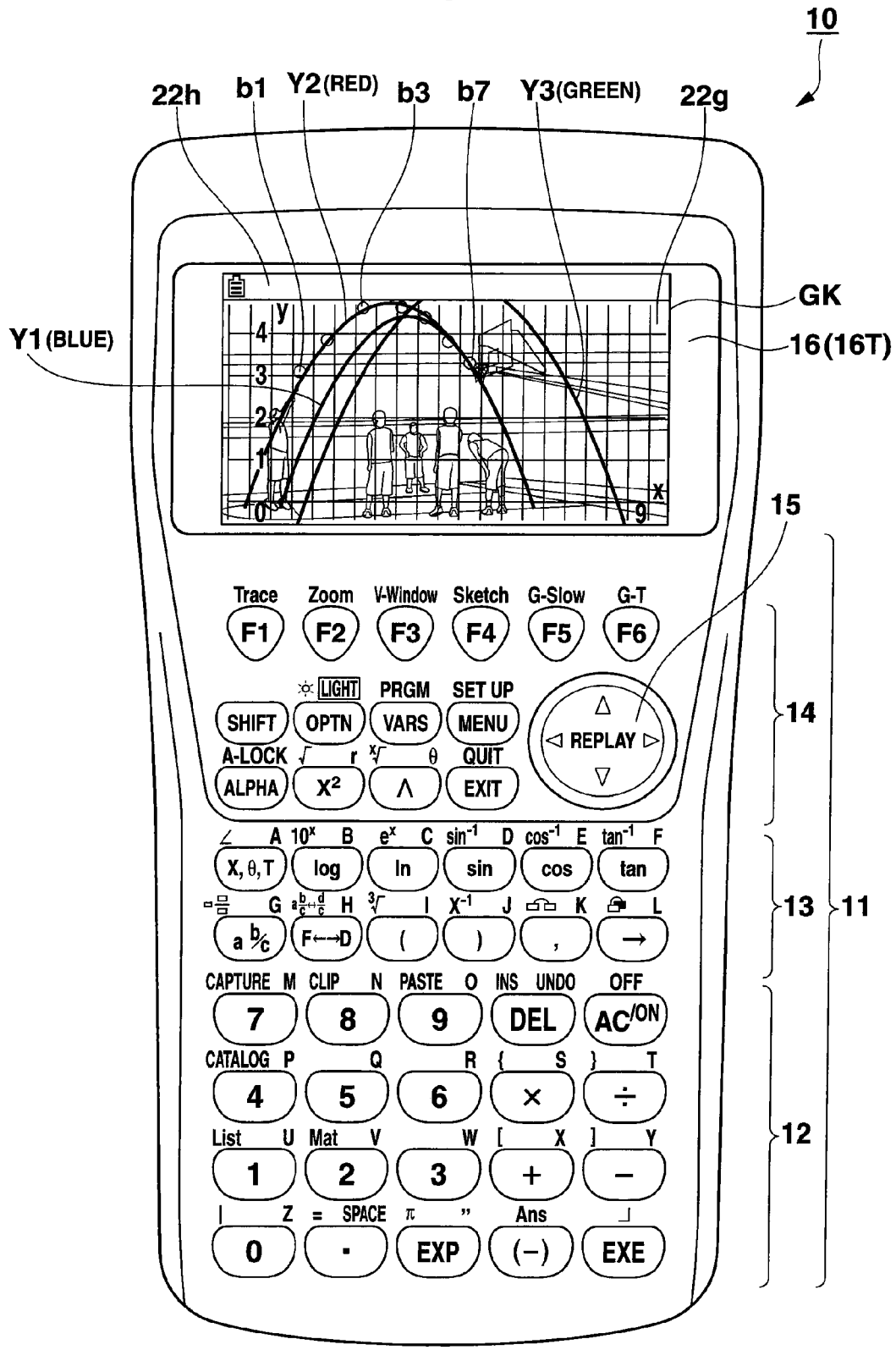
FIG. 1 shows an external configuration of a graph function calculator according to an embodiment of a graph display apparatus of the invention.

FIG. 1 shows an external configuration of a graph function calculator 10 according to an embodiment of a graph display apparatus of the invention.

The graph function calculator 10 is in a small size that enables the user to hold it easily in one hand and operate it with one hand. On the front face of the body of the graph function calculator 10, there are provided a key input unit 11 and a color display unit 16.

The key input unit 11 includes a numeric and operation symbol key group 12 for inputting numbers and formulas and giving instructions to do calculations, a function key group 13 for inputting various functions, a mode setting key group 14 for displaying menu screens for various operation modes and giving instructions to set an operation mode, a cursor key 15 for moving a cursor displayed on the color display unit 16 and selecting data items, and function keys F1 to F6 for selectively specifying various functions that are printed on the key panel or displayed in menu form along the lower end of the color display unit 16.

In the numeric and operation symbol key group 12, 0 to 9 (numeric) keys, +, −, ×, ÷ (operation symbol) keys 12a, an EXE (execution) key 12b, an AC (all clear) key 12c, and others are arranged.

In the function key group 13, a log (logarithm) key, sin (sine) key, ab/c (fraction) key, and others are arranged.

In the mode setting key group 14, a Menu key, SHIFT key, OPTN (option) key, EXIT key, and others are arranged.

On the key panel along the upper edge of each of the keys, an available character, symbol, function, or functional capability is printed. Each of them can be entered by combining SHIFT key in the mode setting key group 14 with the corresponding key.

Figure 9A:
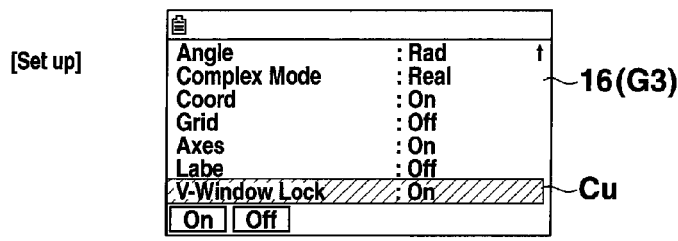
FIGS. 9A, 9B and 9C are diagrams showing display operations (part 3) of the first embodiment in the function graph display process of the graph function calculator 10.

For example, the MENU key combined with SHIFT key functions as SET UP key and can give an instruction to switch to a graph display setting screen G3 (FIG. 9A).

The color display unit 16 includes a dot-matrix color liquid-crystal display unit. On its display screen, a transparent-tablet touch panel 16T for detecting a touch position on the screen is laid.

The graph function calculator 10 has the function of causing the color display unit 16 to display a graph image composition screen GK with a graph according to a preset coordinate range being laid on an image previously captured in the background. The graph image composition screen GK has the function of displaying, in different display colors, for example, graphs Y1, Y3 corresponding to graph formulas input by the user and graph Y2 corresponding to a prepared model formula according to trajectories b1 to b7 of a moving body to be analyzed.

FIG. 2 is a block diagram showing a configuration of the electronic circuitry of the graph function calculator 10. The graph function calculator 10 includes a processor (CPU) 21 of a computer.

The processor (CPU) 21 controls the operations of various parts of the circuit according to a system program previously stored in a memory (flash ROM) 22, a calculator control program read from an external recording medium 23, such as a memory card, into the memory 22 via a recording medium readout unit 24, or a calculator control program downloaded from a Web server (program server) on a communication network, such as the Internet, by a PC communication unit 25 via an external PC 30 and read into the memory 22. Then, the system program or calculator control program previously stored in the memory 22 is activated in response to a key input signal from the key input unit 11 or a touch position detect signal from the touch panel 16T.

Not only the memory 22, recording medium readout unit 24, key input unit 11, and touch panel 16T but also the color display unit (LCD) 16 are connected to the processor (CPU) 21.

The memory (flash ROM) 22 stores, as a calculator control program, an arithmetic processing program for performing arithmetic processing according to an arbitrary formula input by the user from the key input unit 11, a graph drawing program for performing graph drawing according to an arbitrary function expression input by the user, a function graph displaying program 22a for displaying, in learning form, the relationship between the trajectory of a moving body in a prepared image and a graph according to a preset coordinate range, and others.

The memory 22 further includes a graph formula data memory 22b, a V-Window setting value memory 22c, a SET UP data memory 22d, a model formula memory 22e, a user coefficient value data memory 22f, a full color analysis image memory 22g, a color graph image memory 22h, and a file database 22F.

The graph formula data memory 22b stores data on graph formula Y=f(x) input according to a user operation.

The V-Window setting value memory 22 stores a coordinate range (Xmin to Xmax, Ymin to Ymax) and its scale values in displaying a graph on the color display unit 16.

The SET UP data memory 22d stores various items of setting data ([Grid:On (point display)/Off (none)/Line (line display)][Axes: On (scale display)/Off (none)/Scale (scale & numeric display)][Label: On (display of origin and coordinate axis names x, y/Off (none))[V-W Lock: On (no range change)/Off (changeable)], and the like].

The model formula memory 22e stores, together with coefficient values and their allowable ranges, a graph formula Y=f(x) acting as a model in executing the function graph displaying program 22a.

When the user-input graph formula Y=f(x) stored in the graph formula data memory 22b includes coefficients, the user coefficient value data memory 22f stores the coefficient values.

The full color analysis image memory 22g stores, in full color resolution, image data set as an analysis object in executing the function graph displaying program 22a.

The color graph image memory 22h stores graph image data corresponding to a user graph formula stored in the graph formula data memory 22b and graph image data corresponding to a model graph formula stored in the model formula memory 22e as color image data on the basis of the coordinate range and its scale value stored in the V-Window setting value memory 22c and various display setting data ([Grid][Axes][Label][V-W Lock] and the like) stored in the SET UP data memory 22d.

The graph image composition screen GK displayed on the color display unit 16 according to the function graph displaying program 22a is created by laying the graph image data stored in the color graph image memory 22h on the image data stored in the full color analysis image memory 22g in the background.

FIG. 3 is a table showing the contents of an "Images & Coordinate setting & Graph formulas" file stored in a file database 22F of the graph function calculator 10.

The "Images & Coordinate setting & Graph formulas" file is created previously at, for example, the external PC 30 and loaded into the file database 22F of the graph function calculator 10. Alternatively, image data is externally loaded and coordinate setting data and graph formula data are created by the graph function calculator 10. Then, the image data and the graph formula data are stored in the file database 22F.

For example, a file caused to correspond to file name BASKET.g3m stores composite image data of consecutive images in shooting a goal in a basketball game, coordinate setting data includes a coordinate range, its scale values, and display setting data ([Grid][Axes][Label][V-W Lock], and the like), and graph formula data on a graph formula corresponding to a trajectory of a moving body in the composite image.

In the case of a file caused to correspond to file name BALL.g3m, graph formula data includes a graph formula with coefficients, individual coefficient values, and their allowable ranges.

Next, a function graph displaying function of the graph function calculator 10 configured as described above will be explained.

Figure 4:
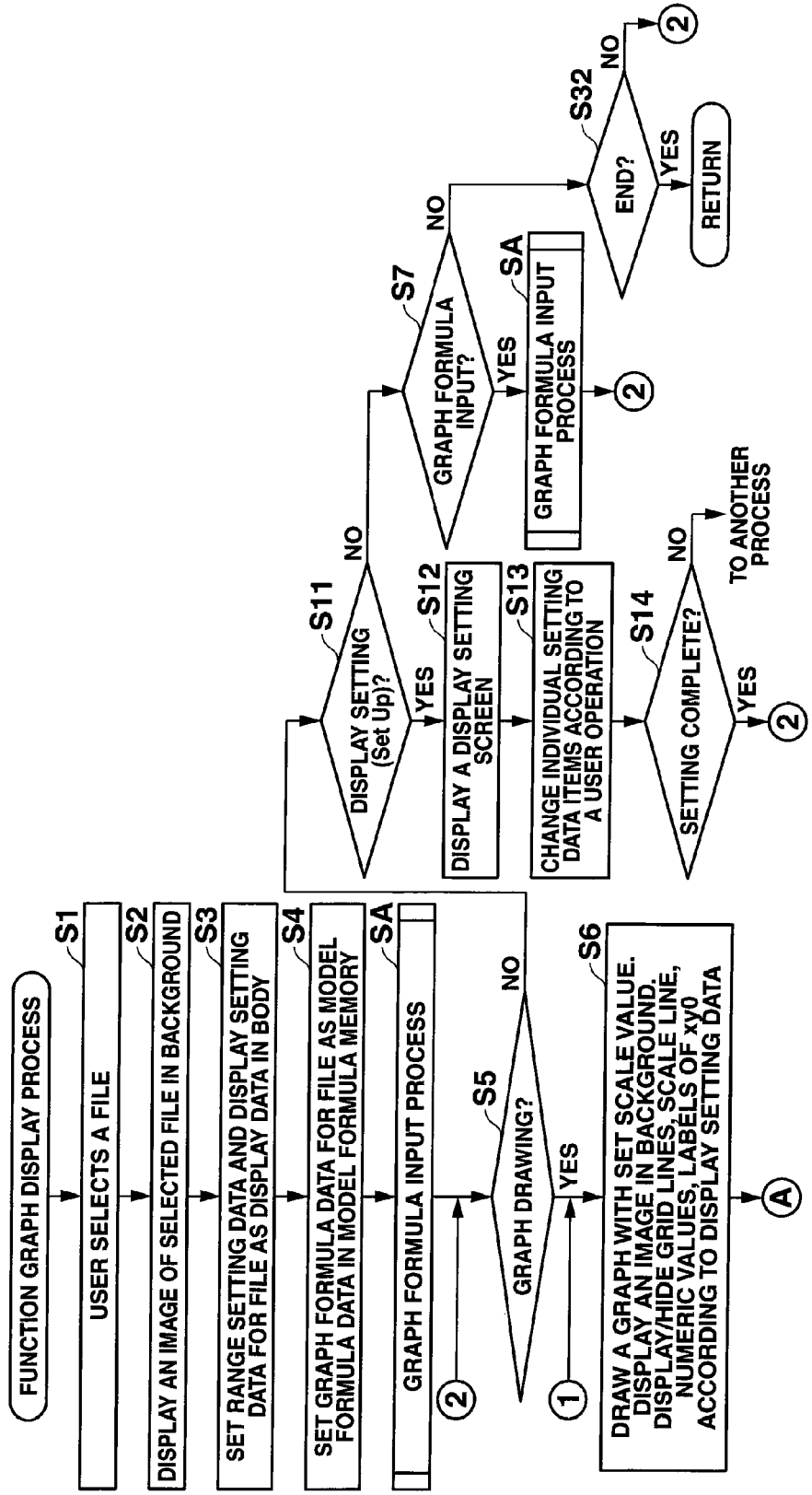
FIG. 4 is a flowchart to explain a function graph display process (part 1) performed by the graph function calculator 10.

FIG. 4 is a flowchart to explain a function graph display process (part 1) performed by the graph function calculator 10.

Figure 5:
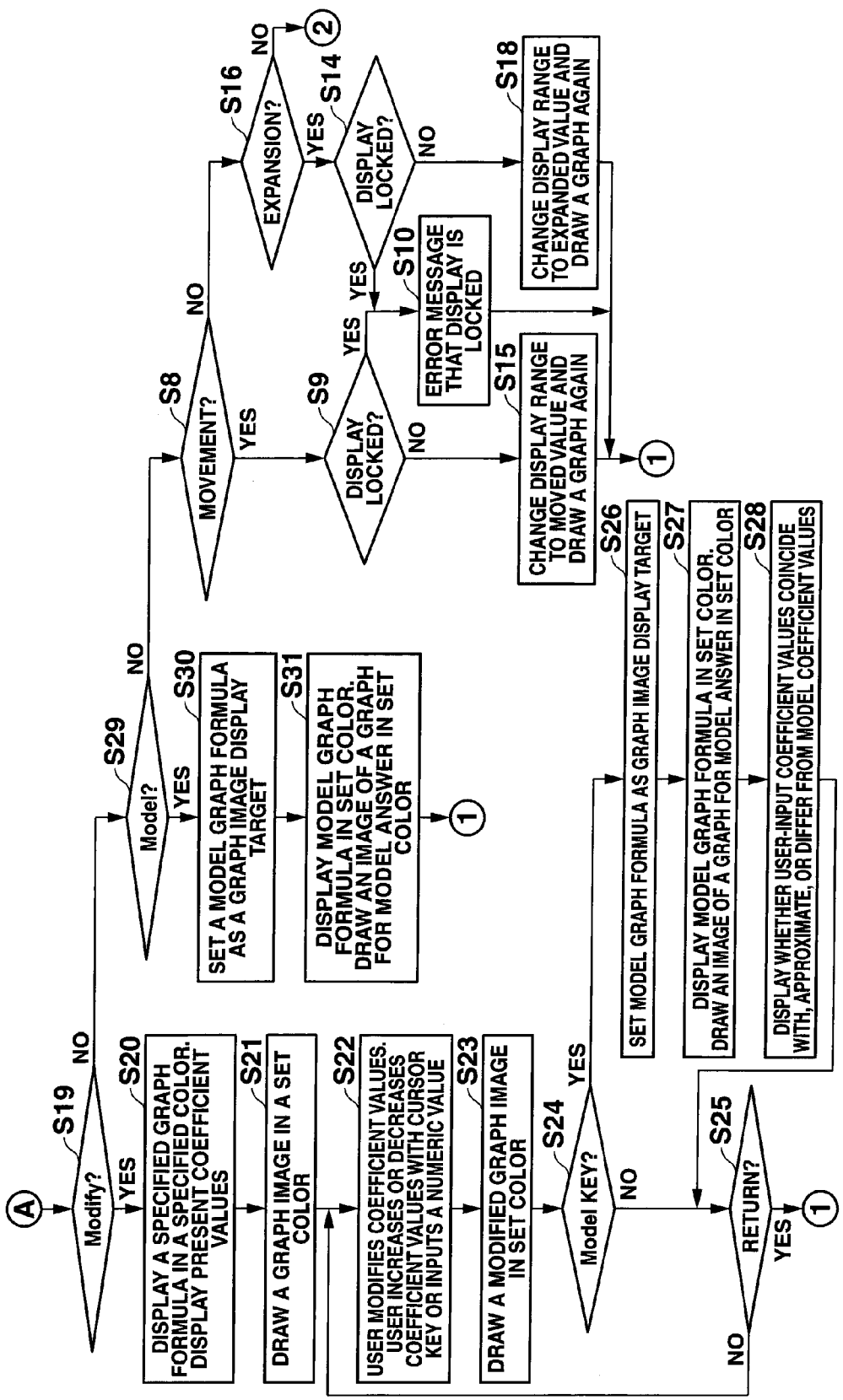
FIG. 5 is a flowchart to explain a function graph display process (part 2) performed by the graph function calculator 10.

FIG. 5 is a flowchart to explain a function graph display process (part 2) performed by the graph function calculator 10.

FIG. 6 is a flowchart to explain a graph formula input process accompanying the function graph display process (part 1) performed by the graph function calculator 10.

(First Embodiment)

FIGS. 7A to 7D are diagrams showing display operations (part 1) of a first embodiment in a function graph display process of the graph function calculator 10.

FIGS. 8A to 8E are diagrams showing display actions (part 2) of the first embodiment in the function graph display process of the graph function calculator 10.

Figure 9B:
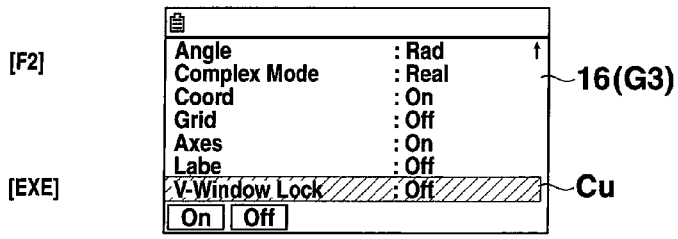
Figure 9C:
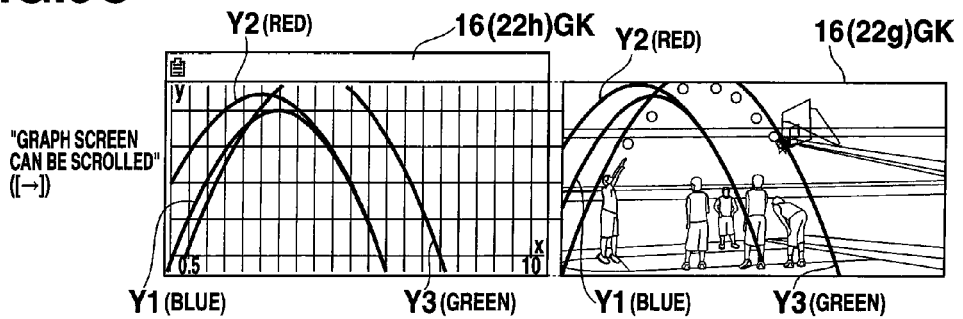

FIGS. 9A to 9C are diagrams showing display actions (part 3) of the first embodiment in the function graph display process of the graph function calculator 10.

Figure 7A:
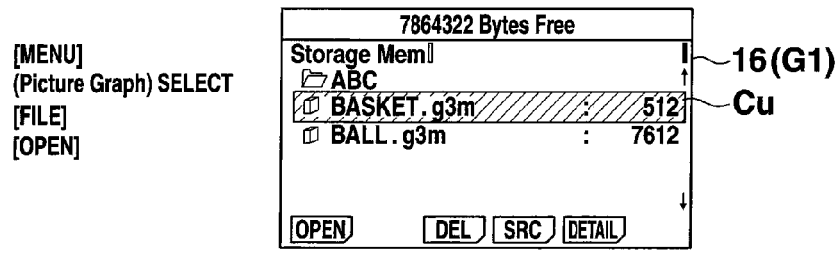
FIGS. 7A, 7B, 7C and 7D are diagrams showing display operations (part 1) of a first embodiment in the function graph display process of the graph function calculator 10.

When "Picture Graph" for creating a graph image composition screen GK has been selected from an operation mode menu screen displayed on the color display unit 16 according to the operation of the MENU key at the key input unit 11 and FILE has been specified from a menu displayed in the lower part of the screen according to the operation of function key Fn, a file selection screen G1 for selecting a desired file from "Image & Coordinate setting & Graph formulas" files 1, 2 stored in the file database 22F of the memory 22 is displayed as shown in FIG. 7A (step S1).

Figure 7B:
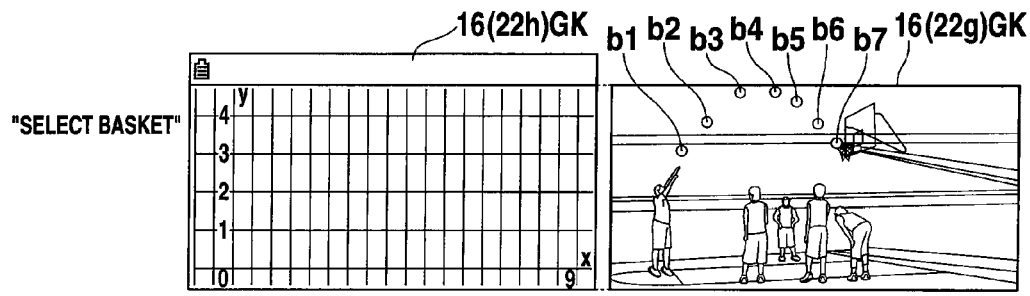

On the file selection screen G1, when file name BASKET.g3m (FIG. 3) desired by the user has been selected with the cursor Cu and OPEN has been selected according to the operation of function key F1, an image in the selected file BASKET.g3m has been read and written into the full color analysis image memory 22g and displayed on the color display unit 16 as a background image as shown in FIG. 7B (step S2).

At this time, a graph coordinate system has not been displayed yet.

In addition, coordinate setting data in the selected file BASKET.g3m has been read and set in the V-Window setting value memory 22c and SET UP data memory 22d of the memory 22 (step S3).

At this time, a graph coordinate system corresponding to the coordinate setting data ([coordinate range (Xmin=−1.0277 to Xmax=9.4272, Ymin=−0.4722 to Ymax=4.6944)] [scale values (X=0.5, Y=1)] [Grid:Line (line display)] [Axes: Scale (scale & numeric display)] [Label: On (display of origin and coordinate axis names x, y)] [V-W Lock: On (no range change)]) (FIG. 3) is written in the color graph image memory 22h and superimposed on an image of BASKET.g3m already displayed as a background image as shown in FIG. 7B, which is displayed as a graph image composition screen GK on the color display unit 16.

If a graph image composition screen GK where the graph coordinate system written in the color graph image memory 22h has been actually superimposed on the image written in the full color analysis image memory 22g is shown diagrammatically, it will look complicated and be difficult to understand. Therefore, FIG. 7B separately shows a screen on which the image is displayed and a screen on which the graph coordinate system is displayed. The same holds true for the rest.

Next, graph formula data in the selected file BASKET.g3m is read and set in the model formula memory 22e of the memory 22 (step S4).

Figure 7C:
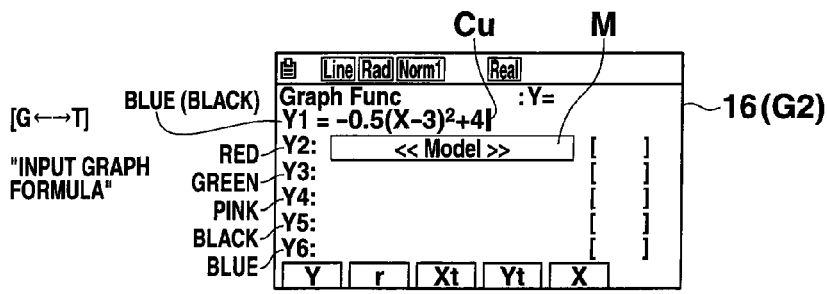

When [G↔T] (switching between a graph and an formula) has been specified according to the operation of function key F6 to analyze trajectories b1 to b7 of a moving body (in this case, a ball) included in the graph image composition screen GK from the graph, control is passed to a graph formula input process of FIG. 6 (step SA). First, as shown in FIG. 7C, a graph formula list screen G2 which lists the individual graph formulas stored in the graph formula data memory 22b and model formula memory 22e is displayed on the color display unit 16 (step A1).

Here, when it has been determined that a model (model answer) has been set because graph formula data Y2=−0.4 (X−2.5)²+4.5 (FIG. 3) in the selected file BASKET.g3m has been set in the model formula memory 22e (Yes in step A2), graph formula Y2 for the model is displayed so as to be covered with mask M represented as <<Model>> (step A3).

In the individual graph formulas listed on the graph formula list screen G2, graph formula Y1 is identified by blue, Y2 by red, Y3 by green, Y4 by pink, and Y5 by black. Y6 and subsequent formulas are identified by the repetition of these colors. Of them, a graph formula selected by cursor Cu as an input target (in this case, Y1") is identified by black.

Then, if it has been determined that model graph formula Y2 [Y2=−0.4(X−2.5)²+4.5] covered with mask M is not a graph formula with coefficients (No in step A4), control goes into a state where a graph formula is to be input according to a user operation.

Here, if graph formula Y1 [Y1=−0.5(X−3)²+4] the user came up with has been input and displayed as shown in FIG. 7C on the basis of moving body trajectories b1 to b7 on the graph image composition screen GK (FIG. 7B) displayed on the color display unit 16 according to steps S1 to S4, the graph formula Y1 is stored in the graph formula data memory 22b (step A5).

Figure 7D:
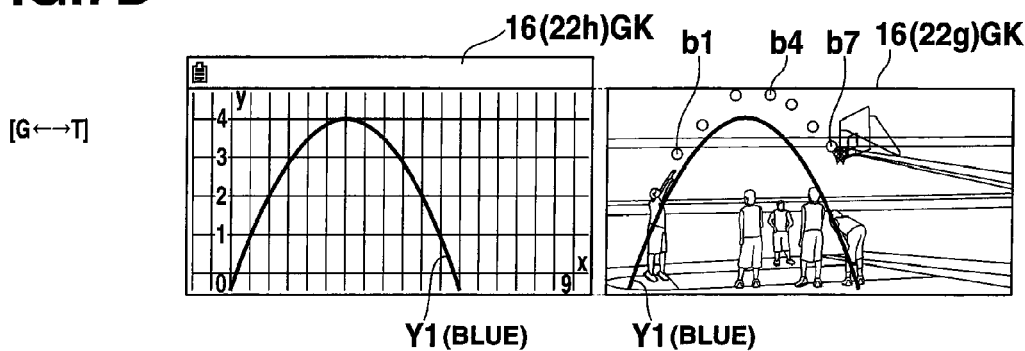

Then, if [G↔T] (switching between a graph and an formula) has been specified according to the operation of function key F6 as shown in FIG. 7D to display a graph corresponding to the user-input graph formula Y1 [Y1=−0.5 (X−3)²+4] on the graph image composition screen GK, it is determined that the input of the graph formula has been completed (No in step A6→Yes in step A7) and that graph drawing has been specified (Yes in step S5).

Then, a graph coordinate system corresponding to coordinate setting data (FIG. 3) in file No. 1 set in the V-Window setting value memory 22c and SET UP data memory 22d is drawn on the color graph image memory 22h. At the same time, graph Y1 corresponding to the user-input graph formula Y1=−0.5(X−3)²+4 is drawn in blue, the display color of graph Y1, according to the drawn graph coordinate system. Then, the image of graph Y1 drawn on the color graph image memory 22h is superimposed on the image of file No. 1 already drawn as a background image on the full color analysis image memory 22g, thereby displaying the resulting image as a graph image composition screen GK on the color display unit 16 (step S6).

In FIG. 7D, although graph Y1 is not drawn directly on the full color analysis image memory 22g on which the background image of file No. 1 has been drawn, the graph image composition screen GK shows how graph Y1 is combined with the moving body trajectories b1 to b7.

Figure 8A:
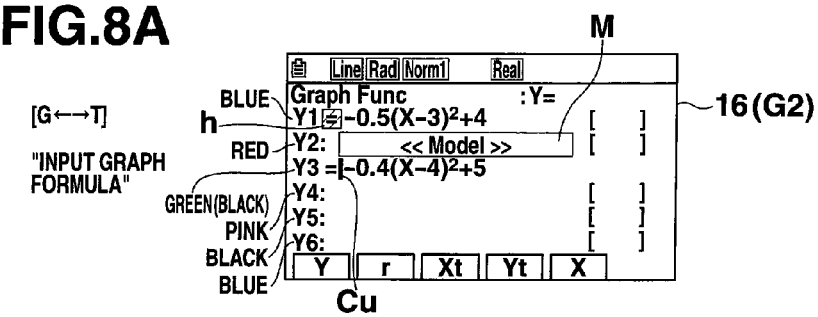
FIGS. 8A, 8B, 8C, 8D and 8E are diagrams showing display operations (part 2) of the first embodiment in the function graph display process of the graph function calculator 10.

When the user has determined on the basis of the graph image composition screen GK displayed on the color display unit 16 that the difference between the moving body trajectories b1 to b7 and graph Y1 is great and therefore specified [G↔T] (switching between a graph and an formula) according to the operation of the function key F6 to add graph Y3, control is passed again to the graph formula input process of FIG. 6 (No in step S5→Yes in step S7→step SA) and a graph formula list screen G2 is displayed on the color display unit 16 as shown in FIG. 8A (step A1).

As in the previous graph formula input process, since it has been determined that a model (model answer) has been set because graph formula data Y2=−0.4(X−2.5)$^2$+4.5 (FIG. 3) in the selected file BASKET.g3m has been set in the model formula memory 22e (Yes in step A2), graph formula Y2 for the model is displayed so as to be covered with mask M represented as <<Model>> (step A3).

In addition, since it has been determined that model graph formula Y2 [Y2=−0.4(X−2.5)$^2$+4.5] covered with mask M is not a graph formula with coefficients (No in step A4), control goes into a state where a graph formula is to be input according to a user operation.

Here, if a new graph formula Y3 [Y3=−0.4(X−4)$^2$+5] the user came up with has been input and displayed as shown in FIG. 8A on the basis of moving body trajectories b1 to b7 on the graph image composition screen GK (FIG. 7D) displayed on the color display unit 16, the graph formula Y3 is stored in the graph formula data memory 22b (step A5).

Figure 8B:
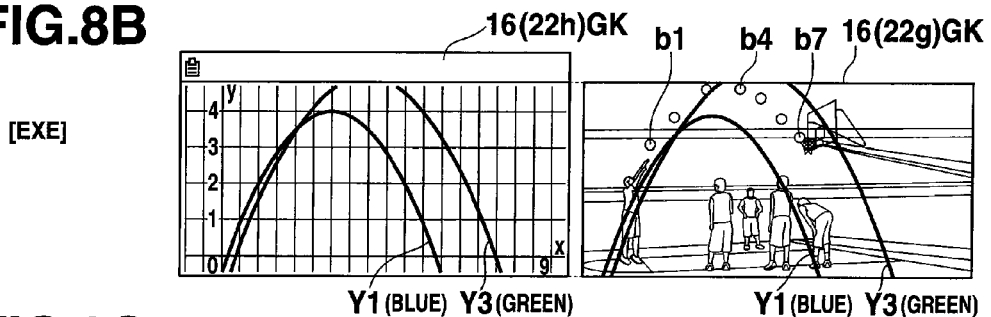

Then, if the EXE (execution) key 12b has been pressed as shown in FIG. 8B to additionally display graph formula Y3 [Y3=−0.4(X−4)$^2$+5] newly input by the user on the graph image composition screen GK, it is determined that the input of the graph formula is complete (No in step A6→Yes in step A7) and that graph drawing has been specified (Yes in step S5).

Then, a graph coordinate system corresponding to coordinate setting data (FIG. 3) in file No. 1 set in the V-Window setting value memory 22c and SET UP data memory 22d is drawn again on the color graph image memory 22h. At the same time, graph Y1 corresponding to the user-input graph formula Y1=−0.5(X−3)$^2$+4 is drawn in blue, the display color of graph Y1, and graph Y3 corresponding to graph formula Y3=−0.4(X−4)$^2$+5 is drawn in green, the display color of graph Y3, according to the drawn graph coordinate system. Then, the images of graphs Y1 and Y3 drawn on the color graph image memory 22h are superimposed on the image of file No. 1 already drawn as a background image on the full color analysis image memory 22g, thereby displaying the resulting image as a graph image composition screen GK on the color display unit 16 (step S6).

Figure 8C:
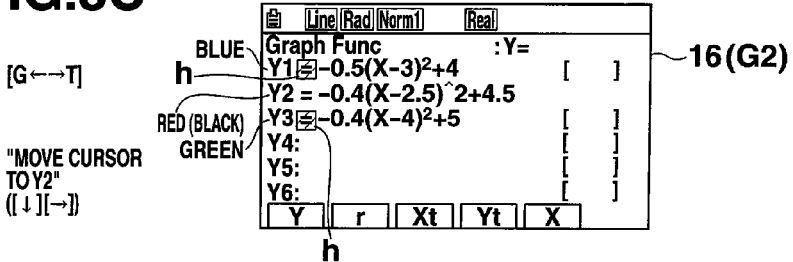

When the user has determined on the basis of the graph image composition screen GK displayed on the color display unit 16 that the difference between moving body trajectories b1 to b7 and graph Y3 is still great and therefore specified [G↔T] (switching between a graph and an formula) according to the operation of function key F6 to refer to model (model answer) graph formula Y2, control is passed again to the graph formula input process of FIG. 6 (No in step S5→Yes in step S7→step SA) and a graph formula list screen G2 is displayed on the color display unit 16 as shown in FIG. 8C (step A1).

In the graph formula list screen G2, the equal sign = in each of graph formulas Y1, Y3 corresponding to the graph already displayed as the graph image composition screen GK is identified in reversed display h.

Here, when cursor. Cu is moved to the position of model graph formula Y2 covered with mask M, mask M is erased and model graph formula Y2 [Y2=−0.4(X−2.5)$^2$+4.5] becomes visible and is set as a target formula in graph display (Yes in steps A2 to A6→step A8).

Figure 8D:
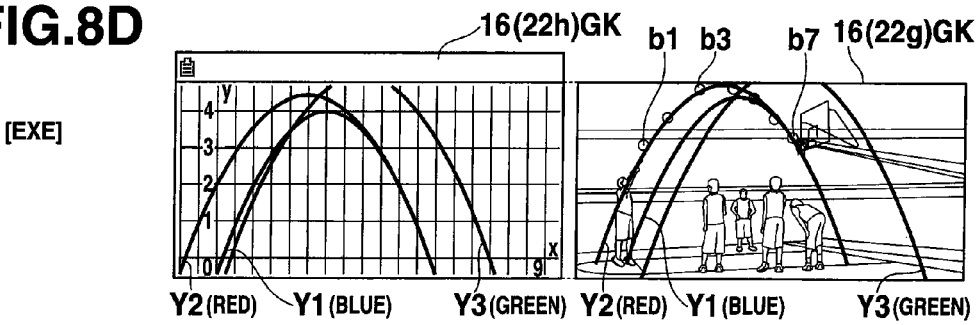

Then, as shown in FIG. 8D, when the EXE key has been pressed, it is determined that the input of the graph formula is complete (Yes in step A7) and that graph drawing has been specified (Yes in step S5).

Then, a graph coordinate system corresponding to coordinate setting data (FIG. 3) in file No. 1 set in the V-Window setting value memory 22c and SET UP data memory 22d is drawn again on the color graph image memory 22h. At the same time, graph Y1 corresponding to the user-input graph formula Y1=−0.5(X−3)$^2$+4 is drawn in blue, the display color of graph Y1, graph Y3 corresponding to graph formula Y3=−0.4(X−4)$^2$+5 is drawn in green, the display color of graph Y3, and graph Y2, corresponding to graph formula Y2=−0.4(X−2.5)$^2$+4.5 is drawn in red, the display color of graph Y2 according to the drawn graph coordinate system. Then, the images of graphs Y1, Y2, and Y3 drawn on the color graph image memory 22h are superimposed on the image of file No. 1 already drawn as a background image on the full color analysis image memory 22g, thereby displaying the resulting image as a graph image composition screen GK on the color display unit 16 (step S6).

As described above, the coordinate system according to the preset range setting data and display setting data is combined with captured full color images trajectories b1 to b7 of a moving body to be analyzed and the resulting image is displayed. At the same time, graphs Y1, Y3 corresponding to the respective graph formulas input by the user to analyze the trajectories b1 to b7 of the moving body according to the coordinate system are combined using the display colors of the respective graph formulas, that is, blue and green, and the resulting image is displayed. Then, when the model (model answer) graph formula previously input so as to correspond to the trajectories b1 to b7 of the moving body to be analyzed has been specified, graph Y2 corresponding to the model graph formula is also combined in red, the display color of the graph formula, for identification.

Accordingly, when a dynamic trajectory in an image is analyzed, the user can learn effectively, while checking the difference between a graph based on the user-input graph formula and its correct answer on the image.

Figure 8E:
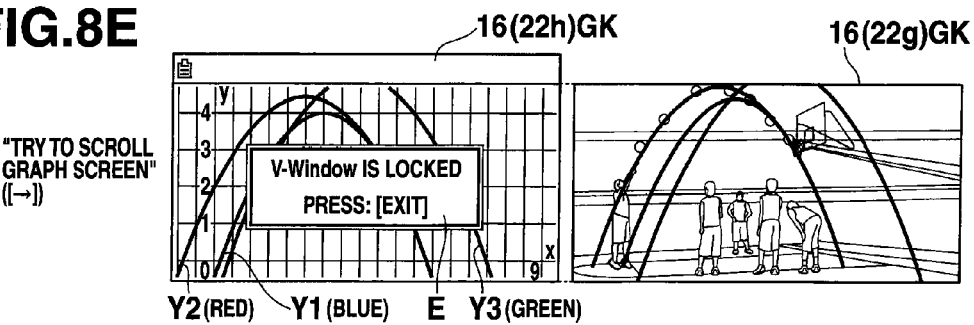

Then, to see the feature points and the like of graphs Y1, Y2, Y3 drawn on the color graph image memory 22h by scrolling the graphs and the coordinate system in an arbitrary direction on the graph image composition screen GK of FIG. 8D, if the user has pressed the → cursor key pointing at the direction in which the user wants to scroll the coordinate system as shown in FIG. 8E, it is determined that the movement of the graph has been specified (Yes in step S8).

Then, it is determined whether [V-W Lock] in the display setting data set in the SET UP data memory 22d is On (no range change) or Off (changeable), that is, whether display is locked or not (step S9).

Here, if it has been determined that [V-W Lock] in the display setting data set in the SET UP data memory 22d is On (no range change) and display is locked (Yes in step S9), error message "V-Window is locked" E meaning that display is being locked is drawn on the graph image in the color graph image memory 22*h*, which is displayed as a graph image composition screen GE (step S10→step S6).

Then, when [Set up] (display setting) has been specified according to the operation of the SHIFT+MENU keys (Yes in step S11), a display setting screen G3 for changing the display setting data set in the SET UP data memory 22*d* according to a user operation is displayed on the color display unit 16 as shown in FIG. 9A (step S12).

On the display setting screen G3, when cursor Cu has been moved to item [V-Window Lock] for setting whether display is locked and item [off] displayed at the lower end of the screen has been selected according to the operation of function key F2 as shown in FIG. 9B, the set contents in item [V-Window Lock] are changed from On to Off (step S13).

Then, when the EXE key is pressed, the changed display setting data is set in the SET UP data memory 22*d* and it is determined that the setting is complete (Yes in step S14) and the same graph image composition screen GK as that before the display setting data was changed is drawn and displayed on the color display unit 16 (Yes in step S5→step S6).

Here, if the → cursor key pointing in a direction in which the user wants to scroll the graph image has been operated again as shown in FIG. 9C and it has been determined that the movement of the graph has been specified (Yes in step S8), it is determined that display has not been locked because item [V-W Lock] in the display setting data set in the SET UP data memory 22*d* is Off (changeable) (No in step S9).

Then, the coordinate range (Xmin to Xmax, Ymin to Ymax) of the color display unit 16 stored in the V-Window setting value memory 22*c* is changed according to the operation of the → cursor key 15 (step S15) and a coordinate system scrolled according to the changed coordinate range and graphs Y1, Y2, Y3 corresponding to the respective graph formulas are drawn on the color graph image memory 22*h*. Then, a graph image composition screen GK obtained by superimposing the scrolled graph image on a background image drawn on the full color analysis image memory 22*g* is displayed on the color display unit 16 (Yes in step S5→step S6).

At this time, on the graph image composition screen GK, a graph image including the coordinate system drawn on the color graph image memory 22*h* is scrolled in an arbitrary direction selected by the user and displayed, whereas the background image drawn on the full color analysis image memory 22*g* is not scrolled and therefore there is a difference between the moving body trajectories b1 to b7 included in the background image and a graph corresponding to model graph formula Y2.

As described above, when item [V-W Lock] in the display setting data whose setting can be changed arbitrarily by the user has been set to On on the graph image composition screen GK obtained by superimposing the graph image drawn on the color graph image memory 22*h* on the background image drawn on the full color analysis image memory 22*g*, scroll display involving the coordinate range of the graph image being moved and changed can be inhibited. When item [V-W Lock] has been set to Off, scroll display involving the coordinate range of the graph image being moved and changed can be performed freely.

Furthermore, when item [V-W Lock] in the display setting data has been set to On, display change involving the coordinate range of the graph image being expanded or narrowed is also inhibited (Yes in step S16→Yew in step S17→S10). In addition, when item [V-W Lock] has been set to Off, display change involving the coordinate range of the graph image being expanded or narrowed can be performed freely (Yes in step S16→No in step S17→S18→S6).

(Second Embodiment)

FIGS. 10A to 10E are diagrams showing display operations (part 1) of a second embodiment in a function graph display process of the graph function calculator 10.

FIGS. 11A to 11E are diagrams showing display operations (part 2) of the second embodiment in the function graph display process of the graph function calculator 10.

Figure 10A:
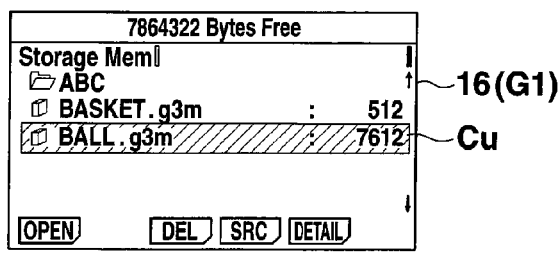
FIGS. 10A, 10B, 10C, 10D and 10E are diagrams showing display operations (part 1) of a second embodiment in the function graph display process of the graph function calculator 10.

When "Picture Graph" for creating a graph image composition screen GK has been selected from a menu screen of operation modes displayed on the color display unit 16 according to the operation of the MENU key of the key input unit 11 and FILE has been specified from a menu displayed at the lower end of the screen according to the operation of function key Fn, a file selection screen G1 for selecting a desired file from "Images & Coordinate setting & Graph formulas" files 1, 2 stored in the file database 22F of the memory 22 is displayed as shown in FIG. 10A (step S1)

Figure 10B:
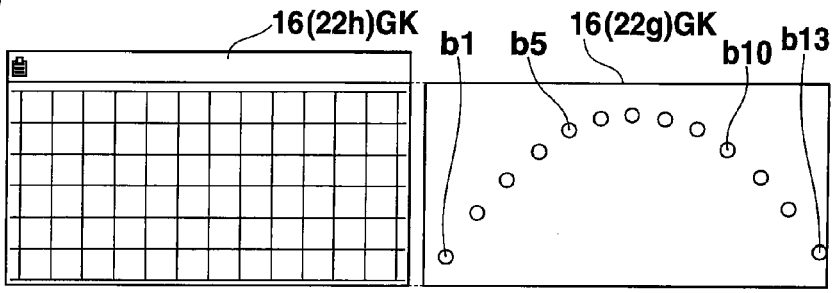

On the file selection screen G1, when file name BALL.g3m (FIG. 3) desired by the user has been selected with cursor Cu and OPEN has been specified by the operation of function key F1, an image in the selected file BALL.g3m is read and written into the full color analysis image memory 22*g* and is displayed as a background image on the color display unit 16 as shown in FIG. 10B (step S2).

At this time, a graph coordinate system has not been displayed yet.

In addition, coordinate setting data in the selected file BALL.g3m is read and set in the V-Window setting value memory 22*c* and SET UP data memory 22*d* of the memory 22 (step S3).

At this time, a graph coordinate system corresponding to coordinate setting data [coordinate range (Xmin=−0.15 to Xmax=6.15, Ymin=0 to Ymax=3)] [scale values (X=0.5, Y=0.5)] [Grid: Line (line display)] [Axes: On (scale display)] [Label: Off (no display of origin and coordinate axis names x, y)] [V-W Lock: On (no range change)] (FIG. 3) set in the V-Window setting value memory 22*c* and SET UP data memory 22*d* is written in the color graph image memory 22*h* and is superimposed on the image of BALL.g3m already displayed as a background image as shown in FIG. 10B. The resulting image is displayed as a graph image composition screen GE on the color display unit 16.

Next, graph formula data in the selected file BASKET.g3m is read and set in the model formula memory 22*e* of the memory 22 (step S4).

When [G⇄T] (switching between a graph and an formula) has been specified according to the operation of function key F6 to analyze trajectories b1 to b13 of a moving body (in this case, a ball) included in the graph image composition screen GK from the graph, control is passed to the graph formula input process of FIG. 6 (step SA). First, as shown in FIG. 10C, a graph formula list screen G2 which lists the individual graph formulas stored in the graph formula data memory 22*b* and model formula memory 22*e* is displayed on the color display unit 16 (step A1).

Here, when it has been determined that a model (model answer) has been set because graph formula data $Y2=PX^2+QX+R$ ($P=-0.26$ [allowable range±0.06]: $Q=1.6$ [allowable range±0.2]: $R=0.3$ [allowable range±0.2]) (FIG. 3) in the selected file BASKET.g3m has been set in the model formula memory 22*e* (Yes in step A2), graph formula Y2 for the model is displayed so as to be covered with mask M represented as <<Model>> (step A3).

Then, if it has been determined that graph formula Y2 [$Y2=PX^2+QX+R$] covered with the mask M is a graph with coefficients (Yes in step A4), control goes into a state where a graph formula is to be input according to a user operation.

Figure 10C:
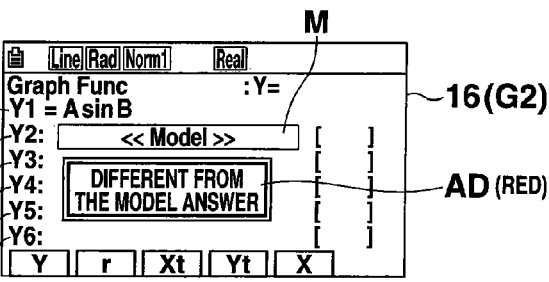

Here, if graph formula Y1 [Y1=A sin B] the user came up with has been input and displayed as shown in FIG. 10C on the basis of moving body trajectories b1 to b13 on the graph image composition screen GK (FIG. 10B) displayed on the color display unit 16 according to steps S1 to S4, the graph formula Y1 is stored in the graph formula data memory 22b (step A9).

Then, it is determined whether the user-input graph formula Y1 [Y1=A sin B] excluding its coefficients, that is, Y1=□ sin □, stored in the model formula memory 22e coincides with model (model answer) graph formula Y2=PX$^2$+QX+R (step A10).

In this case, it has been determined that the former does not coincide with the latter (No in step A10). Then, it is further determined whether a function constituting a part of the user-input graph formula Y1 [Y1=A sin B] coincides with model (model answer) graph formula Y2=PX$^2$+QX+R stored in the model formula memory 22e (step A11).

In this case, too, it has been determined that the former does not coincide with the latter (No in step A11) and a message "Different from the Model Answer" AD informing the user that the user-input graph formula Y1 [Y1=A sin B] differs from model (model answer) graph formula Y2=PX$^2$+QX+R stored in the model formula memory 22e is displayed in red on the graph formula list screen G2 being displayed on the color display unit 16 (step A12).

Figure 10D:
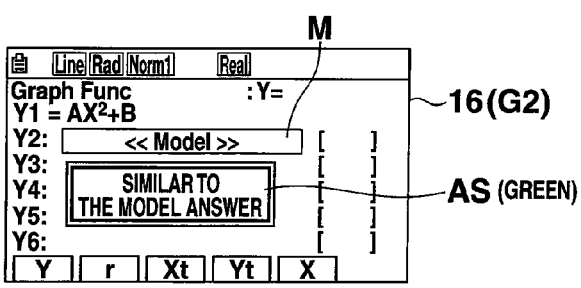

Here, if graph formula Y1 [Y1=AX$^2$+B] has been input again by the user and stored in the graph formula data memory 22b as shown in FIG. 10D (No in step A13→No in step A14→step A9), it is determined that the function constituting a part of formula Y1 coincides with the model (model answer) graph formula Y2=PX$^2$+QX+R (Yes in step A11).

Then, a message "Similar to the Model Answer" AS informing the user that the reentered graph formula Y1 [Y1=AX$^2$+B] is similar to model (model answer) graph formula Y2=PX$^2$+QX+R stored in the model formula memory 22e is displayed in green on the graph formula list screen G2 being displayed on the color display unit 16 (step A15).

Figure 10E:
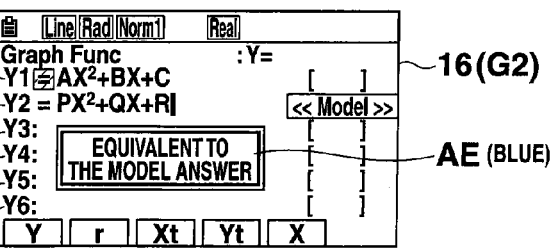

As shown in FIG. 10E, if graph formula Y1 [Y1=AX2+BX+C] has been input again by the user and stored in the graph formula data memory 22b (No in step A13→No in step A14→step A9), it is determined that a part without the coefficients in graph formula Y1, that is, Y1=□X$^2$+□X+□, coincides with model (model answer) graph formula Y2=PX$^2$+QX+R (Yes in step A10).

Then, a message "Equivalent to the Model answer" AE informing the user that the graph formula Y1 [Y1=AX$^2$+B+C] reentered again is equivalent to model (model answer) graph formula Y2=PX$^2$+QX+R is displayed in blue on the graph formula list screen G2 being displayed on the color display unit 16 (step A16).

As described above, equivalence information message AE about the degree of coincidence, similarity information message AS, or difference information message AD is displayed, depending on whether graph Y1 input by the user excluding its coefficients, a function constituting a part of graph Y1, or none of graph Y1 coincides with model (model answer) graph formula Y2 corresponding to moving body trajectories b1 to b13 on the background image.

Therefore, when a dynamic trajectory on an image is analyzed, the user can enter a graph formula more similar to a correct graph formula, while checking, from a message on the screen, the difference between the user-input graph formula and its correct graph formula and therefore can learn effectively.

Here, when cursor Cu is moved to the position of model graph formula Y2 covered with mask M, mask M is erased and model graph formula Y2 [Y2=PX$^2$+QX+R] becomes visible and is set as a target formula in graph display (Yes in steps A13→step A17).

Then, as shown in FIG. 11A, when the EXE key has been pressed, it is determined that the input of the graph formula has been completed (Yes in step A14) and that graph drawing has been specified (Yes in step S5).

Then, a graph coordinate system corresponding to coordinate setting data (FIG. 3) in file No. 2 set in the V-Window setting value memory 22c and SET UP data memory 22d is drawn again on the color graph image memory 22h. At the same time, graph Y1 corresponding to the user-input graph formula Y1=AX$^2$+BX+C (the initial values of coefficients A, B, C being 0) is drawn in blue, the display color of graph Y1. Then, the image of graph Y1 drawn on the color graph image memory 22h is superimposed on the image of file No. 2 already drawn as a background image on the full color analysis image memory 22g, thereby displaying the resulting image as a graph image composition screen GK on the color display unit 16 (step S6).

At this time, the user-input graph formula Y1=AX$^2$+BX+C, coefficient values [A=0, B=0, C=0], and variation [Step=0.1] are not displayed.

Thereafter, when [Modify] has been specified according to the operation of function key Fn from a function menu displayed at the lower end of the screen according to the operation of the OPTN key (Yes in step S19), graph formula Y1=AX$^2$+BX+C specified on the graph formula list screen G2 is displayed in blue, the display color of graph formula Y1. At the same time, the initialized coefficient values [A=0, B=0, C=0] and variation [Step=0.1] in the user coefficient value data memory 22f are displayed (step S20).

Then, graph Y1 corresponding to the specified graph formula Y1=AX$^2$+BX+C and coefficient values [A=0, B=0, C=0] is displayed in blue, the display color of graph formula Y1 (step S21).

Here, as shown in FIG. 11B, coefficient value [C=0] is specified and displayed in red according to the operation of the ↑ cursor key. At the same time, the specified coefficient value [C=0] is increased in units of variation [Step=0.1] to [C=3] according to the repetitive operation of the → cursor key or [C=3] is input directly by operating a numeric key (step S22).

Then, graph Y1 corresponding to graph formula Y1=AX$^2$+BX+C modified using coefficient values [A=0, B=0, C=3] is redrawn in blue on the graph coordinate system expanded on the color graph image memory 22h and superimposed on a background image drawn on the full color analysis memory 22g, thereby displaying the resulting image as a graph image composition screen GK on the color display unit 16 (step S23).

Then, as shown in FIG. 11C, coefficient value [A=0] is specified and displayed in red according to the operation of the ↑ cursor key. At the same time, the specified coefficient value [A=0] is decreased in units of variation [Step=0.1] to [A=−0.3] according to the repetitive operation of the ← cursor key or [A=−0.3] is input directly by operating a numeric key (No in step 24→No in step S25→step S22).

Then, graph Y1 corresponding to graph formula Y1=AX$^2$+BX+C modified using coefficient values [A=−0.3, B=0, C=3] is redrawn in blue on the graph coordinate system expanded on the color graph image memory 22h and superimposed on the background image drawn on the full color analysis memory 22g, thereby displaying the resulting image as a graph image composition screen GK on the color display unit 16 (step S23).

Then, as shown in FIG. 11D, coefficient value [B=0] is specified and displayed in red according to the operation of the ↓ cursor key to make graph Y1 on the graph image composition screen GK more similar to moving body trajectories b1 to b13. At the same time, the specified coefficient value [B=0] is increased in units of variation [Step=0.1] to [B=1.6] according to the repetitive operation of the → cursor key or [B=1.6] is input directly by operating a numeric key (No in step 24→No in step S25→step S22).

Then, graph Y1 corresponding to graph formula Y1=AX$^2$+ BX+C modified using coefficient values [A=−0.3, B=1.6, C=3] is redrawn in blue on the graph coordinate system expanded on the color graph image memory 22h and superimposed on the background image drawn on the full color analysis memory 22g, thereby displaying the resulting image as a graph image composition screen GK on the color display unit 16 (step S23).

At this time, the user can recognize that the blue graph Y1 corresponding to the user-input graph formula Y1=AX$^2$+ BX+C and coefficient values [A=−0.3, B=1.6, C=3] has approximated moving body trajectories b1 to b13 on the background image appreciably on the graph image composition screen GK.

Then, to check how much the blue graph Y1 corresponding to the user-input graph formula differs from graph Y2 corresponding to the model answer graph formula, [Model] is specified according to the operation of function key Fn from the function menu displayed at the lower end of the screen according to, for example, the OPTN key as shown in FIG. 11E (Yes in step S24).

Then, model (model answer) graph formula Y2=PX$^2$+ QX+R (P=−0.26: Q=1.6: R=0.3) stored in the model formula memory 22e is set as a target formula in graph display (step S26) and the model graph formula Y2=PX$^2$+QX+R (P=− 0.26: Q=1.6: R=0.3) is displayed in the set red on the graph formula list screen G2 and graph Y2 corresponding to the model graph formula is displayed in red (step S27).

Then, the difference between the coefficient values [A=−0.3, B=1.6, C=3] of the user-input graph formula Y1=AX$^2$+BX+C and the coefficient values (P=−0.26: Q=1.6: R=0.3) of model graph formula Y2=PX$^2$+QX+R is calculated and it is determined on the basis of the allowable ranges (P=−0.26±0.06: Q=1.6±0.2: R=0.3±0.2) previously set together with the coefficient values of the model graph formula that the difference between them has shown "coincidence," "similarity," or "difference." According to this, a determination message of "similarity" Si is added to coefficient value [A=−0.3] of the user-input graph formula Y1=AX$^2$+BX+C displayed on the graph image composition screen GK and a determination message of "coincidence" Eq is added to each of coefficient value [B=1.6] and coefficient value [C=3] on the screen (step S28).

As described above, when model (model answer) graph formula Y2 corresponding to moving body trajectories b1 to b13 on the background image is coefficient-added graph formula Y2=PX$^2$+QX+R in which coefficient values and their allowable ranges (P=−0.26±0.06: Q=1.6±0.2: R=0.3±0.2) are set and the user-input graph formula Y1 is graph formula Y1=AX$^2$+BX+C which coincides with the graph formula Y2 except for its coefficients, if the coefficient values (A=☐, B=☐, C=☐) of the user-input graph formula Y1=AX$^2$+BX+C are input, they are compared with the coefficient values of the model graph formula Y2 and their allowable ranges and a determination message of "coincidence," "similarity," or "difference" is displayed for each of the user-input coefficient values.

Therefore, when only the coefficient values in the user-input graph formula differ from the correct graph formula, the user can enter coefficient values closer to the coefficient values of the correct graph formula, while checking the degree of the difference between the coefficient values and the correct ones from a determination message on the screen.

Accordingly, the user can learn effectively by making use of the function of displaying the graph image composition screen GK obtained by superimposing a graph image corresponding to the user-input graph formula and a graph image corresponding to the correct graph formula on a background image to be analyzed and the function of displaying a determination message that the user-input graph formula is "equivalent to," "similar to," or "different from" the correct graph formula.

The function of drawing graph Y2 corresponding to the model graph formula by specifying [Model] according to the operation of function key Fn from the function menu displayed at the lower end of the screen according to the operation of the OPTN key and displaying graph Y2 as a graph image composition screen GM can be performed not only in the function of modifying a graph corresponding to the user-input graph formula for which [Modify] has been specified, while increasing and/or decreasing the coefficient values in the graph formula (steps S19 to S28) but also in a state where the graph image composition screen GK is just being displayed (step S6) (steps S29 to S31).

The operating methods of the graph function calculator 10 described in the embodiments, that is, the individual methods including the function graph display process explained in the flowcharts of FIGS. 4 and 5 and the graph formula input process accompanying the function graph display process explained in the flowchart of FIG. 6, can be stored in an external recording medium (23), such as a memory card (e.g., a ROM card or a RAM card), a magnetic disk (e.g., a floppy disk or a hard disk), an optical disk (e.g., a CD-ROM or a DVD), or a semiconductor memory, in the form of programs the computer can execute. Then, the mediums can be delivered. The processor (21) of the electronic calculator (10) loads the program stored in the external recording medium (23) into the memory (22). The computer is controlled by the read-in program, thereby realizing the display function of the graph image composition screen GK explained in the embodiments, which enables the same processes in the aforementioned methods to be carried out.

Furthermore, the data of the programs which realize the above methods can be transferred in the form of program code through a communication network (public lines). The program data can be loaded by communication devices (25) (30) connected to the communication network into the processor (21) of the electronic calculator (10), thereby realizing the display function of the graph image composition screen GK.

The invention is not limited to the above embodiments and, on the basis of available skills in the present or future implementation phase, may be practiced or embodied in still other ways without departing from the spirit or character thereof. The embodiments include inventions of different stages and therefore various inventions can be extracted by combining suitably a plurality of structural requirements disclosed in the embodiments. For example, even if some are removed from all of the structural requirements shown in the embodiments or some structural requirements are combined in a different mode, the resulting configuration can be extracted as an invention, provided that the subject to be achieved by the invention is accomplished and the effect of the invention is obtained.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A graph display apparatus comprising:
an image and graph formula storage unit configured to store image data and a model graph formula corresponding to the image data;
an image display control unit configured to cause a display unit to display the image data stored by the image and graph formula storage unit;
a formula input unit configured to input a graph formula according to a user operation;
an input graph display control unit configured to cause the display unit to display a graph corresponding to the graph formula input by the formula input unit, on the image data displayed on the display unit by the image display control unit as a background image; and
a model graph display control unit configured to cause the display unit to display, in a different display mode, a graph corresponding to the model graph formula stored by the image and graph formula storage unit, together with the graph displayed on the image data as the background image on the display unit by the input graph display control unit, according to a user operation.

2. The graph display apparatus according to claim 1, further comprising a graph formula list display unit configured to display, in list form, the model graph formula stored by the image and graph formula storage unit and the graph formula input by the formula input unit in different display modes,
wherein the graph corresponding to the graph formula displayed by the input graph display control unit and the graph corresponding to the model graph formula displayed by the model graph display control unit are displayed in the same display modes as the respective corresponding graph formulas displayed by the graph formula list display unit.

3. The graph display apparatus according to claim 1, wherein:
the image and graph formula storage unit stores image data, a coefficient-added model graph formula corresponding to the image data, its coefficient values, and approximation ranges of the coefficient values,
the formula input unit inputs a coefficient-added graph formula and its coefficient values according to a user operation, and
the graph display apparatus further comprises a coefficient value determination display control unit configured to (i) determine whether the coefficient values of the coefficient-added graph formula input by the formula input unit coincide with, approximate, or differ from the coefficient values of the coefficient-added model graph formula on the basis of the coefficient-added model graph formula, its coefficient values, and the approximation ranges of the coefficient values stored by the image and graph formula storage unit, and (ii) cause the display unit to display a determination result.

4. The graph display apparatus according to claim 1, further comprising:
a coincidence degree determination unit configured to determine a degree of coincidence of the model graph formula stored by the image and graph formula storage unit with the graph formula input by the formula input unit; and
a coincidence degree display control unit configured to cause the display unit to display the degree of coincidence of the model graph formula with the input graph formula determined by the coincidence degree determination unit.

5. The graph display apparatus according to claim 1, further comprising:
a display setting unit configured to set inhibition or permission of a change of a display range of the graph displayed on the image data as the background image on the display unit by the model graph display control unit, according to a user operation;
a display range change specifying unit configured to specify the change of the display range of the graph according to a user operation; and
a change inhibition display control unit configured to cause the display unit to display information that the change of the display range is inhibited if the inhibition of the change of the display range is set by the display setting unit when the change of the display range of the graph is specified by the display range change specifying unit.

6. A non-transitory computer-readable storage medium having a computer program stored thereon which controls a computer serving as an electronic calculator having a graph display function, to function as units comprising:
an image and graph formula storage unit configured to store image data and a model graph formula corresponding to the image data;
an image display control unit configured to cause a display unit to display the image data stored by the image and graph formula storage unit;
a formula input unit configured to input a graph formula according to a user operation;
an input graph display control unit configured to cause the display unit to display a graph corresponding to the graph formula input by the formula input unit, on the image data displayed on the display unit by the image display control unit as a background image; and
a model graph display control unit configured to cause the display unit to display, in a different display mode, a graph corresponding to the model graph formula stored by the image and graph formula storage unit, together with the graph displayed on the image data as the background image on the display unit by the input graph display control unit, according to a user operation.

7. The non-transitory computer-readable storage medium according to claim 6, wherein the units further comprise:
a graph formula list display unit configured to display, in list form, the model graph formula stored by the image and graph formula storage unit and the graph formula input by the formula input unit in different display modes,
wherein the graph corresponding to the graph formula displayed by the input graph display control unit and the graph corresponding to the model graph formula displayed by the model graph display control unit are displayed in the same display modes as the respective corresponding graph formulas displayed by the graph formula list display unit.

8. The non-transitory computer-readable storage medium according to claim 6, wherein:
the image and graph formula storage unit stores image data, a coefficient-added model graph formula corresponding to the image data, its coefficient values, and approximation ranges of the coefficient values, the formula input unit inputs a coefficient-added graph formula and its coefficient values according to a user operation, and the graph display apparatus further comprises a coefficient value determination display control unit configured to (i) determine whether the coefficient values of the coefficient-added graph formula input by the formula input unit coincide with, approximate, or differ from the coefficient values of the coefficient-added model graph formula on the basis of the coefficient-added model graph formula, its coefficient values, and the approximation ranges of the coefficient values stored by the image and graph formula storage unit, and (ii) cause the display unit to display a determination result.

9. The non-transitory computer-readable storage medium according to claim 6, wherein the units further comprise:

a coincidence degree determination unit configured to determine a degree of coincidence of the model graph formula stored by the image and graph formula storage unit with the graph formula input by the formula input unit; and a coincidence degree display control unit configured to cause the display unit to display the degree of coincidence of the model graph formula with the input graph formula determined by the coincidence degree determination unit.

10. The non-transitory computer-readable storage medium according to claim 6, wherein the units further comprise:

a display setting unit configured to set inhibition or permission of a change of a display range of the graph displayed on the image data as the background image on the display unit by the model graph display control unit, according to a user operation;

a display range change specifying unit configured to specify the change of the display range of the graph according to a user operation; and a change inhibition display control unit configured to cause the display unit to display information that the change of the display range is inhibited if the inhibition of the change of the display range is set by the display setting unit when the change of the display range of the graph is specified by the display range change specifying unit.

* * * * *